United States Patent
Lin et al.

(10) Patent No.: US 10,953,614 B2
(45) Date of Patent: Mar. 23, 2021

(54) MOISTURIZING COMPOSITION OF A CONTACT LENS

(71) Applicant: UNICON OPTICAL CO., LTD., Hsinchu County (TW)

(72) Inventors: Ji-Yu Lin, Hsinchu County (TW); Hsu-Kuei Hsiao, Taichung (TW); Jin-Kun Yeh, Hsinchu County (TW)

(73) Assignee: Unicon Optical Co., Ltd., Baoshan Township, Hsinchu County (TW)

(*) Notice: Subject to any disclaimer, the term of this patent is extended or adjusted under 35 U.S.C. 154(b) by 54 days.

(21) Appl. No.: 16/433,135

(22) Filed: Jun. 6, 2019

(65) Prior Publication Data

US 2020/0070451 A1  Mar. 5, 2020

(30) Foreign Application Priority Data

Aug. 28, 2018 (TW) .................. 107129941

(51) Int. Cl.
| | |
|---|---|
| *G02B 1/04* | (2006.01) |
| *B29D 11/00* | (2006.01) |
| *C08K 5/17* | (2006.01) |
| *C08L 1/28* | (2006.01) |
| *C08L 5/00* | (2006.01) |
| *C08L 33/06* | (2006.01) |

(Continued)

(52) U.S. Cl.
CPC .......... *B29D 11/00067* (2013.01); *C08K 5/17* (2013.01); *C08L 1/284* (2013.01); *C08L 5/00* (2013.01); *C08L 33/066* (2013.01); *C08L 33/10* (2013.01); *C08L 33/14* (2013.01); *G02B 1/043* (2013.01)

(58) Field of Classification Search
CPC ...................................................... G02B 1/043
See application file for complete search history.

(56) References Cited

U.S. PATENT DOCUMENTS

| | | | |
|---|---|---|---|
| 9,310,627 B2 | 4/2016 | Havenstrite et al. | |
| 2014/0010855 A1* | 1/2014 | Mahadevan | ........... A01N 59/16 424/409 |

FOREIGN PATENT DOCUMENTS

| | | |
|---|---|---|
| CN | 101854939 A | 10/2010 |
| CN | 102119932 A | 7/2011 |
| CN | 105917270 A | 8/2016 |

(Continued)

OTHER PUBLICATIONS

Examination Report dated Dec. 10, 2020 for corresponding CN patent application No. 201910500213.3.

*Primary Examiner* — Michael F Pepitone
(74) *Attorney, Agent, or Firm* — Rosenberg, Klein & Lee

(57) ABSTRACT

A moisturizing composition of a contact lens is disclosed in the present invention. A rinse agent (ex. TEOA) is applied for bonding a moisturizing stabilizer (ex. HPMC) and a compound of a hydrophilic cosolvent (ex. PEG) and a moisturizing additive (ex. HA). Hence, the solubility of the moisturizing additive and the aqueous solution can be improved via applying the hydrophilic cosolvent; the stability of the combination of the moisturizing stabilizer and the moisturizing additive can be improved via the structural and the chemical stabilities of the moisturizing stabilizer itself. Meanwhile, the moisturizing composition disclosed can be directly applied to the raw material of the conventional contact lens during manufacturing the high-moisturizing contact lenses.

15 Claims, 4 Drawing Sheets

(51) Int. Cl.
*C08L 33/10* (2006.01)
*C08L 33/14* (2006.01)

(56) References Cited

FOREIGN PATENT DOCUMENTS

CN 110114119 A 8/2019
KR 20180001201 A 1/2018

* cited by examiner

MOISTURIZING COMPOSITION OF A CONTACT LENS

This application claims priority for Taiwan patent application no. 107129941 filed on Aug. 28, 2018, the content of which is incorporated by reference in its entirely.

BACKGROUND OF THE INVENTION

Technical Field

The present invention is related to a composition of the contact lens, especially, is related to a moisturizing composition of a contact lens, which can be directly applied to the raw material of the contact lens for improving the moisturizing ability of the contact lens.

Description of Related Art

The earliest technology of the contact lens was developed in 19 century. In the beginning, the contact lens was rigid and usually made of glass. Thus, the foreign body sensation was unpleasant and uncomfortable for the user. Until the middle of 20 century, the contact lens was made from the polymer material instead of glass due to the gradually-matured development of polymer science. The most common material of the contact lens was poly(methyl methacrylate) (PMMA) because of its smooth surface, high anti-precipitation and good transmittance. Owing to the poor oxygen permeability of PMMA, however, the hydrogel material such as hydroxyethyl methacrylate (HEMA) was developed for the soft lens as well as the silicone hydrogel material such as the organosilicon polymer (ex. poly-dimethylsiloxane, PDMS) was developed for the hard lens.

Accordingly, HEMA is mainly developed due to its high moisture content. As known, the higher moisture content of the hydrogel material is, the higher oxygen permeability of the hydrogel material is. For instance, the HEMA material has the oxygen permeability up to DK30 as its moisture content around 70%. However, the high moisture content of the HEMA relays on the tears from the user, that is, the moisture of the HEMA could not reach to such high content if the secretion of tear is not sufficient. Under the condition that the secretion of tear is not sufficient, the foreign body sensation, dry, allergy and poor oxygen permeability caused via the low moisture content of the contact lens would lead to the hypoxia in eye and abnormal blood vessels proliferation on the surface of the retina. Even worse, the dry contact lens would stretch the cornea.

In spite of the high oxygen permeability of the organo-silicon polymer (ex. poly-dimethylsiloxane, PDMS), the hydrogel material is still required as the organosilicon polymer served as the main material for the contact lens. This is because that the organosilicon polymer itself is hydrophobic, the addition of the hydrogel material would be helpful for improving the wettability.

Accordingly, a moisturizing composition of a contact lens is disclosed in the present invention. The moisturizing composition of a contact lens provides the high and lasting moisture content and improves the wettability. Thus, the moisturizing composition may be exerted to various types of the contact lens.

BRIEF SUMMARY OF THE INVENTION

The main purpose of the present invention is to provide a 3-dimensional crosslinking structure for moisture capture via a moisturizing stabilizer having highly structural stability and chemical stability. The lens can keep the moisture itself avoiding absorbing tears from the eye so that the illness caused via the dry in the eye can be relieved.

Another purpose of the present invention is to bond a hydrophilic cosolvent to a larger-molecular-weight moisturizing additive to improve the hydrophilic characteristic of the moisturizing additive. Meanwhile, a moisturizing stabilizer, a first polymer and a second polymer are bonded strongly and steadily via the addition of a surfactant. Hence, the moisturizing additive can strongly and steadily bond to the first polymer and the second polymer via the moisturizing stabilizer.

Another purpose of the present invention is to provide a moisturizing composition, which includes a moisturizing stabilizer and a moisturizing additive, to apply for various types of contact lens for the high moisture content.

Another purpose of the present invention is to provide a moisturizing composition. According to different raw materials of the contact lens, various polymers, hydrophilic cosolvents and surfactants can be chosen for stabilizing the bonding of the moisturizing stabilizer and the moisturizing additive to the other materials of the contact lens.

Another purpose of the present invention is to provide a moisturizing composition, which can be processed with the raw material of the contact lens simultaneously. Thus, the manufacturing process of the contact lens can be simplified and the stability of the moisturizing composition during process can be improved.

For achieving the purposes mentioned above, a moisturizing composition of a contact lens is disclosed in the present invention. The moisturizing composition includes a first complex and a second complex. The first complex includes at least one moisturizing stabilizer, at least one first polymer, at least one surfactant and RO-water serving as the solvent. The moisturizing stabilizer comprises 5~10% by weight of the first complex. The first polymer comprises 35~40% by weight of the first complex. The surfactant comprises 25~30% by weight of the first complex. The RO-water comprises 25~40% by weight of the first complex. The second complex includes at least one second polymer, at least one hydrophilic cosolvent, at least one moisturizing additive and RO-water serving as the solvent. The second polymer comprises 35~50% by weight of the second complex. The hydrophilic cosolvent comprises 1~20% by weight of the second complex. The moisturizing additive comprises 0.01~3% by weight of the second complex. The RO-water comprises 55~75% by weight of the second complex. In the present invention, the moisturizing additive bonded to the hydrophilic cosolvent bonds strongly and steadily to the moisturizing stabilizer via the exertion of the surfactant. Thus, the hydrophilic cosolvent of the present invention makes the moisturizing additive and the aqueous solution easily soluble. Owing to the highly structural stability and chemical stability of the moisturizing stabilizer, the bonding of the moisturizing stabilizer and the moisturizing additive becomes strong and steady.

DETAILED DESCRIPTION OF THE INVENTION

Figure 1:
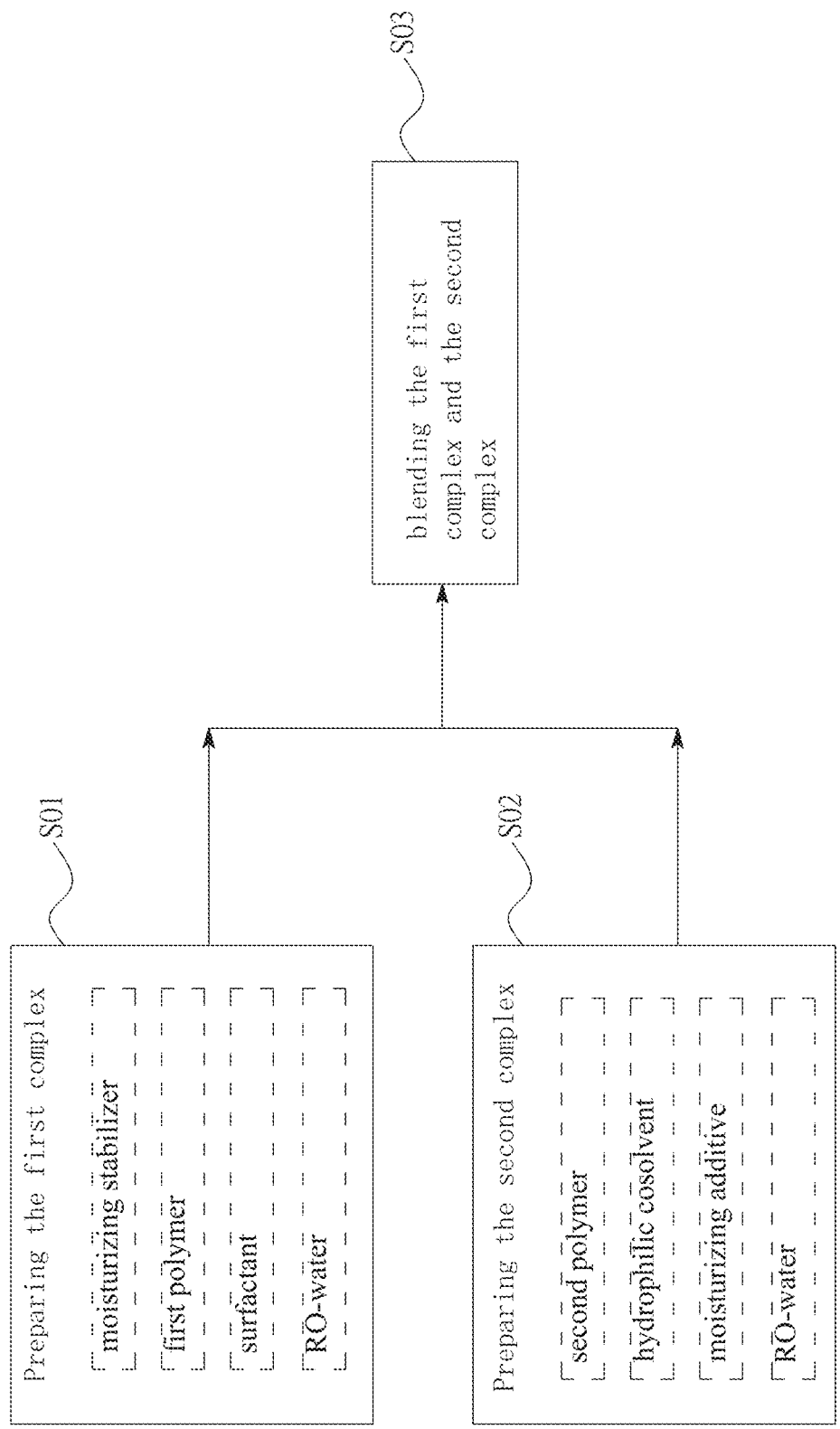
FIG. 1 illustrates a process flow chart of a moisturizing composition of a contact lens of the present invention.

The embodiments of the present invention will be further illustrated by the following associated drawings. The skilled in the art can make various changes and modifications based on the contents of the present invention.

A moisturizing composition of a contact lens is disclosed in the present invention. The moisturizing composition includes a first complex and a second complex. The first complex includes at least one moisturizing stabilizer, at least one first polymer, at least one surfactant and RO-water serving as the solvent. The moisturizing stabilizer comprises 5~10% by weight of the first complex. The first polymer comprises 35~40% by weight of the first complex. The surfactant comprises 25~30% by weight of the first complex. The RO-water comprises 25~40% by weight of the first complex. The second complex includes at least one second polymer, at least one hydrophilic cosolvent, at least one moisturizing additive and RO-water serving as the solvent. The second polymer comprises 35~50% by weight of the second complex. The hydrophilic cosolvent comprises 1~20% by weight of the second complex. The moisturizing additive comprises 0.01~3% by weight of the second complex. The RO-water comprises 55~75% by weight of the second complex.

More details about the materials mentioned above would be defined as below. The moisturizing stabilizer is nonionic cellulose ether, such as hypromellose (HPMC) commonly applied for the eyedrops and the contact lotion and serving as moisture supplier. At least one of the first complex and the second complex is a nonionic material. To prevent the protein precipitation and impurity contamination, both of the first complex and the second complex are nonionic materials. Some materials of the first polymer and the second polymer may be selected but not limited from the materials below. The material of the first polymer and second polymer can be selected from the group of comprising hydroxyethyl methacrylate (HEMA), glycerylmethacrylate (GMMA), (ethoxyethoxy)methyl acrylate (EEMA), ethyleneglycol dimethacrylate (EGDMA), dimethylaminoethyl methacrylate (DMAEMA), benzoyl peroxide (BPO), methyl methacrylate (MAA), glycidyl methacrylate (GMA), azobisisobutyronitrile (AIBN), benzoyl isopropanol, benzoin methyl ether (BME), N-Vinylpyrrolidone (NVP), α-AG, chitosan and the combinations thereof. The material of the first polymer can be or not be identical to the material of the second polymer. The surfactant can be triethanolamine (TEOA), which is widely used for eye medicine. The surfactant not only serves as an acid-base balance agent but bonds to the moisturizing stabilizer, aqueous solution (ex. RO-water) and main-body polymers (ex. first polymer and second polymer) to stabilize the molecular bonding. The hydrophilic cosolvent is selected from the group of comprising polyethylene glycol (PEG), polyvinyl alcohol (PVA) and the combinations thereof. Take PEG as example, the PEG can easily bond to the hydrophobic molecules, and the bonding ability of the hydrophobic molecules to the aqueous molecules can be improved. The moisturizing additive is selected from trehalose, hyaluronic acid (HA) or any other moisturizing ingredients and the combinations thereof. For example, HA has poor hydrophilic property because HA is a kind of protein with larger molecular weight. The hydrophilic solvent, such as PEG, can bond to the moisturizing additive, such as HA, to improve the hydrophilic property of the moisturizing additive.

Hence, the moisture absorbing ability of the moisturizing stabilizer of the first complex can be improved via the addition of the surfactant. The hydrophilic property of the moisturizing additive of the second complex can be improved via the addition of the hydrophilic cosolvent. Consequently, after blending the first complex and the second complex, the first polymer and the second polymer can be well blended. That is, the moisturizing additive having good hydrophilic property can be filled within the well-moisturized moisturizing stabilizer having a 3-dimensional crosslinking structure. The moisturizing stabilizer covering the first polymer and the second polymer absorbs a great amount of the moisturizing additive so that the moisture content of the contact lens is increased and the moisture of the contact lens itself also keeps sufficient. Since the contact lens itself is quite moisturized, no more tears are required from the eye. The moisturizing composition of the present invention can make the contact lens itself well-moisturized.

Hereinafter, a preferred recipe of the moisturizing composition of the present invention is revealed as below. The moisturizing stabilizer of the first complex is hypromellose (HPMC) and, for this ingredient, preferably comprises 6~9% by weight of the first complex. The first polymer is hydroxyethyl methacrylate (HEMA) and, for this ingredient, preferably comprises 27~29% by weight of the first complex. The surfactant is triethanolamine (TEOA) and, for this ingredient, preferably comprises 35~37% by weight of the first complex. The RO-water of the first complex for the recipe mentioned above preferably comprises 27~29% by weight of the first complex. The hydrophilic cosolvent of the second complex is polyethylene glycol (PEG) and, for this ingredient, preferably comprises 3.5~5% by weight of the second complex. The second polymer is hydroxyethyl methacrylate (HEMA), as identical to the first polymer, and, for this ingredient, preferably comprises 37.5~38.5% by weight of the second complex. The moisturizing additive is hyaluronic acid (HA) and, for this ingredient, preferably comprises 0.1~0.5% by weight of the second complex. The RO-water of the second complex for the recipe mentioned above preferably comprises 56~58% by weight of the second complex.

Figure 2:
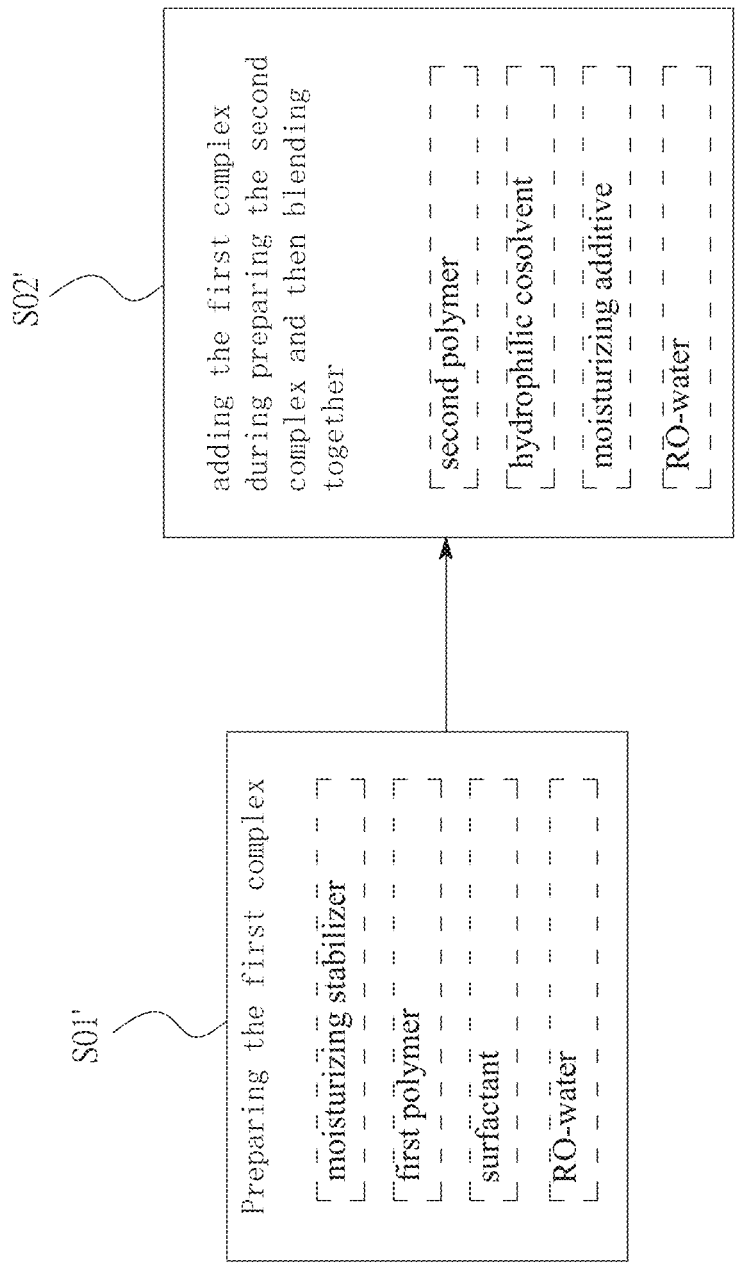
FIG. 2 illustrates another process flow chart of a moisturizing composition of a contact lens of the present invention.
Figure 3:
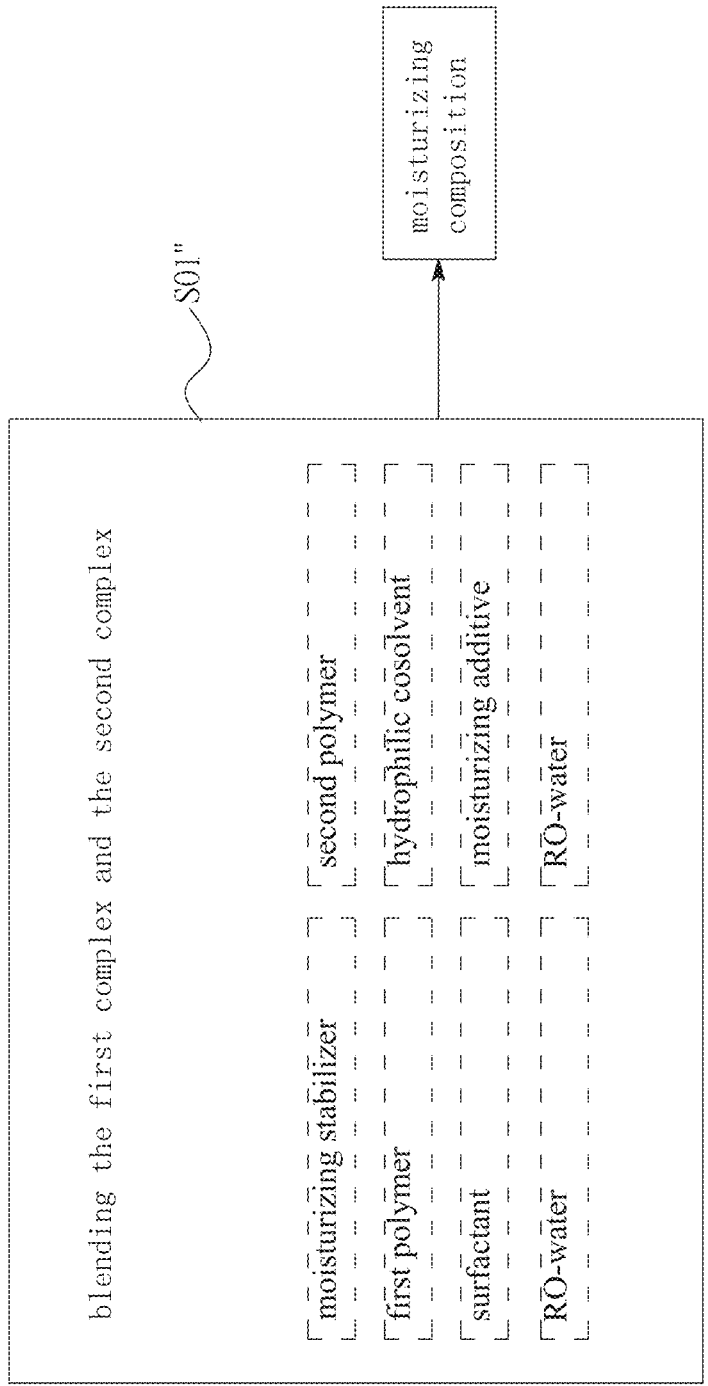
FIG. 3 illustrates another process flow chart of a moisturizing composition of a contact lens of the present invention.

The process of the moisturizing composition of the present invention is disclosed as below. The first complex and the second complex can be prepared individually as two RO-water solutions and then blend together later. As illustrated in FIG. 1, in the step S01, preparing the first complex. In the step S02, preparing the second complex. In the step S03, blending the first complex of the step S01 and the second complex of the step S02. The first complex can be prepared in the beginning and is added to the second complex as preparing the second complex, and the process is illustrated in FIG. 2. In the step S01', preparing the first complex as a RO-water solution. Adding the first complex to the second complex during preparing the second complex, as illustrated in the step S02'. Then, well blending the mixture of the first complex and the second complex. Additionally, the sequence of preparing the first and the second complexes is not limited. Even, all the ingredients of the first complex and the second complex can be blended all together simultaneously. As illustrated in FIG. 3, in the step S01", all the ingredients are blended all together within a single step. The RO-water may serve as the solvent during blending the first complex and the second complex. Or even some cosolvent may be added to the RO-water. The cosolvent may be such as polyethylene glycol (PEG), polyvinyl alcohol (PVA) or any other hydrophilic solvent and so on. The mixing ratio of the second complex to the first complex is 1 to 1. However, all the processes disclosed in the present invention can be exerted for all materials disclosed in the present invention and, meanwhile, are only some embodiments of the present invention instead of limiting the scope of the present invention.

Besides, the moisturizing composition can be directly added to the raw material of the contact lens to make the contact lens more hydrophilic. Preferably, in order to produce a highly hydrophilic contact lens, the mixing ratio of the moisturizing composition including the first polymer and the second polymer and the raw material of the contact lens is ranging from 0.01%:99.99% to 2%:98%. The range of the mixing ratio of the moisturizing composition and the raw material depends on the raw material, the requirement of moisture content of the contact lens as well as other actual demands. For example, for certain recipe, the mixing ratio of the moisturizing composition and the raw material is preferably 0.09%:99.91%.

In order to verify the performance of the moisturizing composition of the present invention, the diopter corrections of the testers are ranging from −0.75~−9.50, and the radii of curvature of the contact lens are ranging from 8.40~8.80 mm. The test includes 11 check items, such as sensations of dryness, searing, itchiness, stinging, foreign body, tiredness and edge as well as the photophobia, tearing, unstable correction of eyesight and shifting. The test result shows that only few testers encounter the problem of shifting, and few testers have the sensation of edge within 1 hour. Only one tester has the temporarily sensation of dryness in the first hour of the beginning of the test, and the sensation of dryness disappears gradually over 1-hour-wearing of the contact lens. Generally, the sensation of comfort is up to 98% according to the 60-eye test result.

Figure 4:
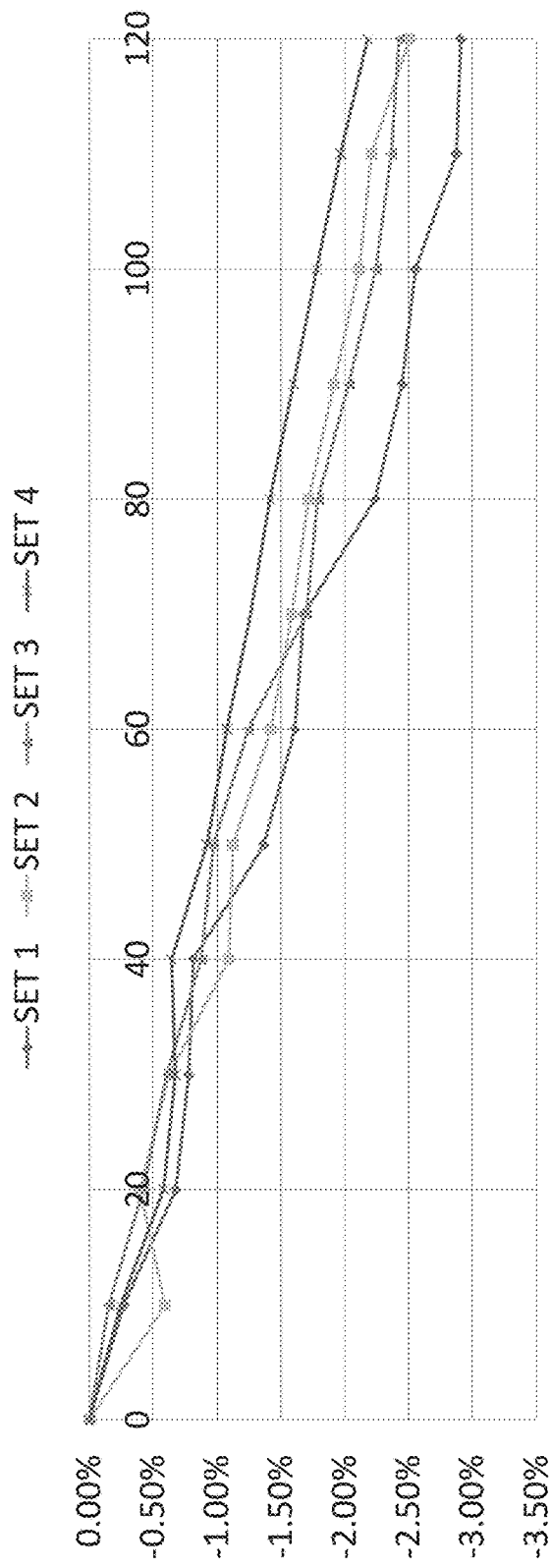
FIG. 4 illustrates a test result of a moisturizing composition of a contact lens of the present invention.

Under the test condition of 98%-humidity setting and 25° C.-temperature setting, the contact lens having the moisturizing composition is tested for 2 minutes and recorded every 10 seconds. The weight variation of the contact lens is recorded to monitoring the moisture loss within the contact lens. Refer to FIG. 4, the SET 1 of the contact lens has no addition of any moisturizing composition, the SET 2 of the contact lens has addition of conventional moisturizing composition, the SET 3 the contact lens has addition of single unit of the moisturizing composition of the present invention, and the SET 4 the contact lens has addition of double units of the moisturizing composition of the present invention. According to the results illustrated in FIG. 4, under the test condition of 98%-humidity setting and 25° C.-temperature setting, the weight loss of the contact lens of the SET 1 (no addition of any moisturizing composition) after 1 minute is approximately 1.61%, and the weight loss of the contact lens of the SET 1 after 2 minutes is approximately 2.91%. The weight loss of the contact lens of the SET 2 (addition of the conventional moisturizing composition) after 1 minute is approximately 1.42%, and the weight loss of the contact lens of the SET 2 after 2 minutes is approximately 2.51%. Comparing to the SET 1 (no addition of any moisturizing composition), the moisture absorbing ability of addition of the conventional moisturizing composition (ex. SET 2) is 15% higher. The weight loss of the contact lens of the SET 3 (addition of single unit of the moisturizing composition of the present invention) after 1 minute is approximately 1.24%, and the weight loss of the contact lens of the SET 3 after 2 minutes is approximately 2.43%. The weight loss of the contact lens of the SET 4 (addition of double units of the moisturizing composition of the present invention) after 1 minute is approximately 1.07%, and the weight loss of the contact lens of the SET 4 after 2 minutes is approximately 2.18%. Apparently, the weight losses of the SET 1 are the highest among all the other sets. The moisture absorbing ability of the contact lens can be increased 20~30% after adding the moisturizing composition. Further, the initial moisture content of the contact lens having the moisturizing composition is higher than the contact lens having no any addition of the moisturizing composition. In this embodiment, the initial moisture content of the contact lens having the moisturizing composition is larger than 0.32 g. That is, the addition of the moisturizing composition can prevent the moisture loss as well as improve the ability of moisture absorption.

Hence, the moisturizing additive bonded to the hydrophilic cosolvent bonds strongly and steadily to the moisturizing stabilizer via the exertion of the surfactant. The hydrophilic cosolvent of the present invention makes the moisturizing additive and the aqueous solution easily soluble. Owing to the highly structural stability and chemical stability of the moisturizing stabilizer, the bonding of the moisturizing stabilizer and the moisturizing additive becomes strong and steady. Meanwhile, the moisturizing composition can be blended with the raw material of the contact lens. The moisture absorbing ability of the contact lens can be enhanced owing to the addition of the moisturizing composition instead of absorbing the moisture from the eye. Thus, even after a long-time duration of wearing the contact lens, no sensation of dryness would be occurred.

The embodiments described above are intended only to demonstrate the technical concept and features of the present invention so as to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:
1. A moisturizing composition of a contact lens including:
a first complex, including:
at least one moisturizing stabilizer, comprising 5~10% by weight of the first complex;
at least one first polymer, comprising 35~40% by weight of the first complex; and
at least one surfactant, comprising 25~30% by weight of the first complex;
wherein the moisturizing stabilizer, the first polymer and the surfactant are dissolved in reverse osmosis (RO)-water, which comprises 25~40% by weight of the first complex; and
a second complex, blended with the first complex, including:
at least one second polymer, comprising 35~50% by weight of the second complex;
at least one hydrophilic cosolvent, comprising 1~20% by weight of the second complex; and
at least one moisturizing additive, comprising 35~50% by weight of the second complex;
wherein the second polymer, the hydrophilic cosolvent and the moisturizing additive are dissolved in RO-water, which comprises 55~75% by weight of the second complex.

2. The moisturizing composition of a contact lens of claim 1, wherein the moisturizing stabilizer is nonionic cellulose ether.

3. The moisturizing composition of a contact lens of claim 1, wherein the moisturizing stabilizer is hypromellose (HPMC).

4. The moisturizing composition of a contact lens of claim 1, wherein at least one of the first complex and the second complex is a nonionic material.

5. The moisturizing composition of a contact lens of claim 1, wherein the first polymer monomer is selected from the group consisting of hydroxyethyl methacrylate (HEMA), glycerylmethacrylate (GMMA), (ethoxyethoxy)methyl acrylate (EEMA), ethyleneglycol dimethacrylate (EGDMA), dimethylaminoethyl methacrylate (DMAEMA), methyl methacrylate (MAA), glycidyl methacrylate (GMA), and the combinations thereof.

6. The moisturizing composition of a contact lens of claim 1, wherein the second polymer monomer is selected from the group consisting of hydroxyethyl methacrylate (HEMA), glycerylmethacrylate (GMMA), (ethoxyethoxy)methyl acrylate (EEMA), ethyleneglycol dimethacrylate (EGDMA), dimethylaminoethyl methacrylate (DMAEMA), methyl methacrylate (MAA), glycidyl methacrylate (GMA), and the combinations thereof.

7. The moisturizing composition of a contact lens of claim 1, wherein the surfactant is triethanolamine (TEOA).

8. The moisturizing composition of a contact lens of claim 1, wherein the hydrophilic cosolvent is selected from the group consisting of polyethylene glycol (PEG), polyvinyl alcohol (PVA) and the combinations thereof.

9. The moisturizing composition of a contact lens of claim 1, wherein the moisturizing additive is selected from trehalose, hyaluronic acid (HA) and the combinations thereof.

10. The moisturizing composition of a contact lens of claim 1, wherein the second complex is blended with the first complex via RO-water.

11. The moisturizing composition of a contact lens of claim 10, wherein the second complex is blended with the first complex further via RO-water having polyethylene glycol (PEG).

12. The moisturizing composition of a contact lens of claim 1, wherein a mixing ratio of the second complex and the first complex is 1.

13. The moisturizing composition of a contact lens of claim 1, wherein the first complex and the second complex are prepared simultaneously or separately.

14. The moisturizing composition of a contact lens of claim 1, wherein the lens is made of hydrogel or silicone hydrogel.

15. The moisturizing composition of a contact lens of claim 1, mixed with a raw material of the contact lens in a ratio ranging from 0.01%:99.99% to 2%:98%.

* * * * *